United States Patent
Qian

(10) Patent No.: US 7,698,676 B1
(45) Date of Patent: Apr. 13, 2010

(54) METHOD AND SYSTEM FOR IMPROVING MANUFACTURABILITY OF INTEGRATED DEVICES

(75) Inventor: Qi-De Qian, 159 Gilbert Ave., Santa Clara, CA (US) 95051

(73) Assignee: Qi-De Qian, Santa Clara, CA (US)

( * ) Notice: Subject to any disclaimer, the term of this patent is extended or adjusted under 35 U.S.C. 154(b) by 251 days.

(21) Appl. No.: 11/164,106

(22) Filed: Nov. 10, 2005

(51) Int. Cl.
*G06F 17/50* (2006.01)

(52) U.S. Cl. .................................. 716/8; 716/5; 716/21

(58) Field of Classification Search ...................... 716/5, 716/8, 21
See application file for complete search history.

(56) References Cited

U.S. PATENT DOCUMENTS

| | | | |
|---|---|---|---|
| 6,066,179 A | 5/2000 | Allan | |
| 6,275,971 B1* | 8/2001 | Levy et al. | 716/5 |
| 6,536,023 B1* | 3/2003 | Mohan et al. | 716/5 |
| 6,802,050 B2* | 10/2004 | Shen et al. | 716/8 |
| 7,024,655 B2* | 4/2006 | Cobb | 716/19 |
| 7,100,134 B2* | 8/2006 | Wu et al. | 716/5 |
| 7,284,231 B2 | 10/2007 | Lucas et al. | |
| 7,380,227 B1* | 5/2008 | Li | 716/5 |
| 2006/0080630 A1* | 4/2006 | Lin | 716/11 |

OTHER PUBLICATIONS

G. A. Allan, A. J. Walton, R. J. Holwill, "An Yield Improvement Technique for IC Layout Using Local Design Rules", IEEE Trans. CAD. vol. 11 pp. 1355-1362 1992.

N. Harrison, "A simple via duplication tool for yield enhancement", IEEE Int. Symp. Defect Fault Tolerance VLSI Systems, pp. 39-47, 2001 pp. 556-573, Apr. 2001.

Martin Keck, Christof Bodendorf, Jorg Thiele, Alberto L. Gomez, Ying-Chung Tseng, and Teng-Yen Huang , "Simulation based OPC for contact pattern using 193 nm lithography" Proc. SPIE Int. Soc. Opt. Eng. 5853, 776 (2005).

Yang et. al. "An Up-stream Design Auto-fix Flow for manufacturability Enhancement", Design Automation Conference, Jul. 24-28, 2006, San Francisco, CA. USA.

Oka et. al. "New OPC Method for Contact Layer to Expand Process Margin", Proc. of SPIE vol. 6607, 660732, (2007).

* cited by examiner

*Primary Examiner*—Vuthe Siek

(57) ABSTRACT

A method and system for improving the yield of integrated devices by adaptively selecting contact and via sizes is described. According to this invention, the drawn size of via holes in a design layout is selected based on its adjacent geometry objects. The invention comprises identifying the minimal space required for placing a via; analyzing available free space for potential via size increase; identifying the proximity configuration of the via with other vias; selecting an appropriate via size based on the free space and proximity configuration to create a new design layout; and fabricate the new layout with proximity correction on the photomask such that vias of a plurality of sizes are reproduced on silicon within predetermined tolerances.

20 Claims, 3 Drawing Sheets

METHOD AND SYSTEM FOR IMPROVING MANUFACTURABILITY OF INTEGRATED DEVICES

FIELD OF THE INVENTION

The present invention relates generally to the manufacturing of integrated devices and more particularly to methods and system for optimizing their design layout for yield improvement.

BACKGROUND OF THE INVENTION

An integrated circuit chip is fabricated according to a design layout. A typical design layout has polygonal shapes arranged in different layers, where each layer is associated with a certain step in manufacturing process. A modern integrated circuit chip has many layers comprising active devices, interconnecting conductors, and via layers. The active devices are responsible for amplification or switching while interconnect and vias are responsible for wiring the active devices together.

On an integrated circuit chip, interconnection resides in different wiring or routing layers sandwiched by layers of inter layer dielectric. Vertical electrical connections between interconnect layers are accomplished by forming via holes in the inter layer dielectric and then fill them with a conducting material. A special kind of vertical connection is the Ohmic contact, or contact in short, to the semiconductor active device. For the purpose of this disclosure, the terms contact and via are interchangeable. Both contacts and vias are represented by rectangular geometries drawn in a special contact or via layer that specify the size and position of the hole to be made on inter layer dielectric. A design layout typically has one contact layer and many via layers.

In chip manufacturing, the design layout of a via layer is first mapped to a corresponding photomasks plate. Vias holes on the wafer are formed by projecting the image of the photomask onto the wafer that is coated with photoresist. The portion of photoresist inside the via area is exposed by ultraviolet (UV) light. The exposed photoresist is dissolved in a subsequent development step, revealing the insulating material to be removed. An etch step that follows removes the insulating material inside via area and forms the actual via hole. To form the conductive path, the via hole is filled with conductive material that connects the top and bottom conductive layers. For the purpose of this disclosure, we call both contact holes and via holes as via holes.

In order to minimize the chip area, the size of via hole is made as small as possible. As the degree of integration increases, the number of vias on a chip has reached many billions. At these large numbers, even a very low failure rate can result in significant number of actual chip failures. As a result, via failure become one of the main causes for chip malfunction.

In order to improve the manufacturing yield, method such as via doubling has been employed in prior art layout [1]. In this scheme, more than one vias is inserted to replace a single via whenever space is available. This operation is performed without generating design rule violations or increases in chip area.

Conventional via doubling inserts additional vias of the same size into the available space. This means the available space must be large enough to accommodate at least two vias plus the minimal via-to-via spacing constraints. Locations where the area is not sufficient for two vias could not benefit from this approach. In addition, the area required for placing an additional via contributes to an increase the capacitance that slows down the circuit operation. Further, it is more difficult to manufacture a pair of small, closely spaced vias using photolithography than one via with an increased area.

The concept of improving yield using an enlarged via to replace a via of minimal size was proposed by Allen et. al. [2], where the size of a via is increased whenever there is space for it to expand without violating design rules. In theory, an expanded via would have better immunity to defects and easier to open in a lithography process.

In practice, however, using variable via and contact sizes lead to serious control problem in manufacturing. The actual contact or via sizes on the chip follows a nonlinear relationship with its drawn size. A larger contact in the drawing becomes even larger on the wafer if the minimal sized contact is to stay on target. Similarly, an increase in the dimension in one direction also causes the image to bloat in the perpendicular direction.

The reason for the non-linear relationship comes from the via size selection. In order to save chip area, via size is selected to be below the linear imaging regime where geometric optics ensures linear scaling. The size of a via hole in a layout drawing is typically smaller than the UV wavelength used for exposing the via. Although the physical size of the hole on the photomask is typically 4 to 5 times larger than the drawn value in the layout, the diffraction effect is very strong during the imaging of the contact and via holes. Under this condition, one can still control the recipe as long as only one type of hole is required.

The difference in size between the drawn and the actual wafer hole becomes even larger when we further consider the etching step in forming the hole on the inter layer dielectric. The etch rate for a bigger hole is faster as the transport of reactive species becomes less constricted as the hole gets bigger.

When vias of different drawn size distort in different ways due to complicated processing physics, it becomes very difficult to control the amount of overlap, or via coverage, on the bottom and top connections for the via. Vias could become only partially covered by the top and bottom conductor, which could potentially lower the chip yield.

The second difficulty is the lack of automatic means to determine the appropriate contact or via size during layout design. Due to the large number of contact and vias, the process of deciding their size on an individual basis becomes impractical. As a result, variable via size are not used for signal connections in circuits such as random logic.

In a highly repetitive product such as the cell bank of a dynamic random access memory, flash memory, and static random access memory, a few handcrafted cells are arrayed to cover a large portion of the chip. For these special, highly repetitive products, variable contact shape have been used to reduce electrical resistance in tight spaces [2].

This disclosure proposes methods for the implementing variable via sizes in an integrated device containing a large number of irregularly spaced circuit elements such as random logic circuits, data path circuits, an element of field programmable gate array (FPGA), radio-frequency circuits, and most of the analog circuitry.

SUMMARY OF THE INVENTION

The present invention relates to a method for improving the yield of integrated circuits by minimizing the number of minimal sized vias. Methods are developed for expanding contacts and vias in a design layout according to their surrounding conditions and in compliance with design rule and design objective. The bounding box of via hole on the wafer is made to match its counter part in the layout drawing by applying compensation means the photomask.

In a preferred embodiment, vias are identified and tagged according to their functions in the circuit and their pairing conditions. A weighting factor is determined based on the type of tag and used to control the magnitude of the expansion. The layout is then analyzed to identify the free spaces. Based on this analysis, the vias are expanded into the free space without violating design rules.

In a preferred embodiment, we perform a few minor modifications to existing software packages used for via doubling. Identifying and creating free space are already performed in these tools. An additional feature of allowing a via to expand when the free space is less than that required for via doubling would implement the present invention In a preferred embodiment, the steps of identifying free space and expanding via are formulated as an engineering change order and performed under the constraint of design objective by an engineering change order tool.

In accordance with present invention, distortion resulting from expanding a via hole is controlled by a model based optical proximity correction procedure during mask data generation. This step would match the bounding box of the via hole on the chip to the bounding box of the drawn layout.

In accordance with present invention, we insert a yield enhancement step whenever the relative positioning of the layout building blocks becomes available. In a preferred embodiment, the result after placement and route is analyzed to identify the gaps between building blocks. This form of free space is used for yield enhancement purposes where the layout building block and the vias inside are expanded to absorb the free space represented by the gap. In an alternative embodiment, we pre-characterize more than one version of building blocks, each having a different set of via sizes and area footprints. After placement and route, we select the version that has the highest yield characteristics that can still fit into the allocated space.

The method according to present invention improves the yield while taking much less space than via doubling method. Locations that could not accommodate two minimal vias and their minimal spacing can now get various degrees of improvement by enlarging the single via size. The reduction in required space also leads to smaller loading capacitance in the circuit. Further, the variable via method disclosed in this application can also work in conjunction with via doubling method.

BRIEF DESCRIPTION OF THE DRAWINGS

The invention is generally shown by way of example in the accompanying drawings in which.

Definition List 1

Figure 1:
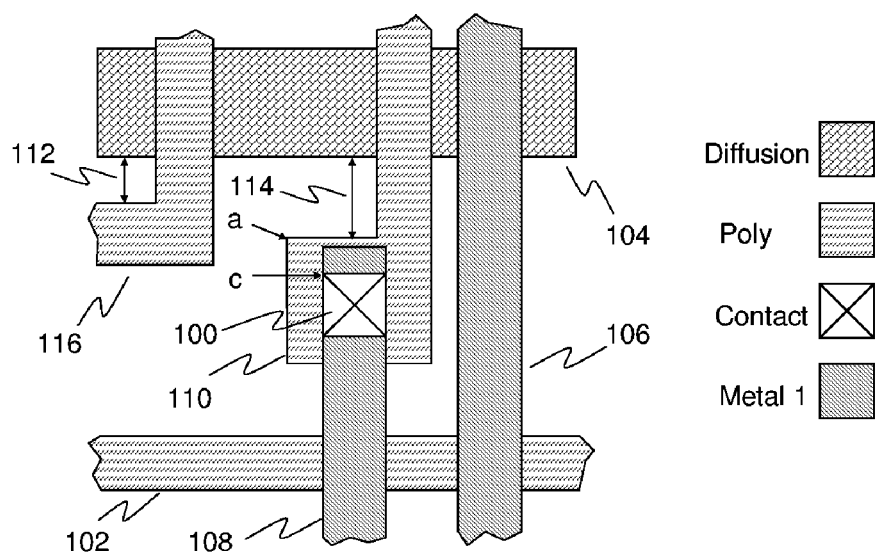
FIG. 1 is a schematic diagram showing a design layout fragment.

| Term | Definition |
| --- | --- |
| Inter Layer Dielectric | Dielectric material used to electrically separate closely spaced interconnect lines arranged in several levels (multilevel metallization) in an advanced integrated circuit. |
| Via | Hole etched in the interlayer dielectric which is then filled with metal, to provide vertical connection between stacked up interconnect metal lines or between metal and semiconductor. |
| Design rules | Minimum dimensions of devices and interconnects comprising an integrated circuit adopted during design stage; determined by the capabilities of process technology available. |
| Mask | device used to shape desired geometries on the surface of the wafer |
| Photomask | Mask used in photolithography to block resist exposure to UV radiation in selected areas; consists of chrome opaque areas supported by high quality quartz plate transparent to UV radiation. |
| Phase shifting feature | A feature on the mask made of material with desired refractive index and thickness in order to shift phase of light passing through transparent portion of the mask. A phase shift mask is a photomask having phase shifting features. |
| Subresolution assist feature | Features placed on a photomask to assist the printing of primary features. The sizes of these features are designed such that they are below the resolution limit of the lithography tool and would not appear on the wafer as distinct features. |
| Standard cell library | The standard libraries consist of a collection of logic functions that have both a logical and physical representation. |
| Design Layout | Integrated circuit layout is the representation of an integrated circuit in terms of planar geometric shapes that specify the shapes on silicon after semiconductor device fabrication. |
| Mask Layout | Mask layout is the representation of a mask in terms of planar geometric shapes. The shapes on a mask layout are generated based on the design layout such that the image it project on silicon closely resembles the design layout. Today's mask layout may include polygonal shapes that are heavily distorted from the design drawing, subresolution assist features, phase shifting features, and even additional exposure layers. |
| Placement and Route | Place and Route is a stage in design of integrated circutis at which a layout of a larger block of the circuit or the whole circuit is created from layouts of smaller building blocks. Due to the complexity of the task, it is usually performed in two separate stages, placement, i.e., determining the positions of the sub-blocks in the design area, and routing, i.e., interconnecting the building blocks. |
| GDSII | GDSII is binary data format for representation of planar geometric shapes, text labels and some other information in hierarchical form. |
| OASIS | Open Artwork System Interchange Standard is a specification for hierarchical integrated circuit layout data format for interchange between EDA software, IC mask writing tools and mask inspection tools. |

-continued

Definition List 1

| Term | Definition |
| --- | --- |
| CIF | Caltech Intermediate Form is a geometry language for VLSI design, in which the primitives are colored rectangles. |

DETAILED DESCRIPTION OF THE PREFERRED EMBODIMENTS

Some preferred embodiments of the present invention will be described in detail with reference to the related drawings of FIGS. 1-6. Additional embodiments, features and/or advantages of the invention will become apparent from the ensuing description or may be learned by the practice of the invention.

The methods and apparatus described here are with respect to integrated circuit manufacturing; however, the techniques described here can be applied to manufacturing or design of any device that require pattern transfer of small hole from a polygon database drawing to physical materials using lithographic and/or etch methods. Examples of these include integrated optical devices, microelectromechanical systems (MEMS), gene chips, micromachines, disk drive heads, etc.

The following description includes the best mode presently contemplated for carrying out the invention. This description is not to be taken in a limiting sense, but is made merely for describing the general principles of the invention.

We refer to geometry objects in a layout as layout objects, which could be an edge of a polygon, a polygon, or a group of polygons forming an active device. During layout design, a designer tries to pack as much functionality as possible into a given area. However, because layout objects have finite and unequal sizes, the packing of these layout object often leave some objects at greater than minimal distance allowed by design rules, which we define as free spaces.

After making an initial or partial layout, a designer can use the system in the present invention to improve the manufacturability of his design within the boundary of design rule and original design objective. This step, we call design for manufacturability compilation, or DFM compilation, improves the manufacturing yield of a design by reducing the number of features that could challenge manufacturing capabilities, i.e. the critical features.

An example of a critical feature is the minimal size contact and via holes, which are among the most difficult feature to manufacture by photolithography due to their small size. During photolithography, the peak intensity inside a hole is proportional to the area of the hole. The higher peak intensity allows the hole to be open more easily. Because of the area relationship and high contrast of the photoresist, a slight increase in the size of the hole brings about significant improvement to the printability, which translates to a higher probability for the hole to be opened successfully. Similar advantages also exist for other processing steps involved in conducting via formation such as etching, and filling the hole with conducting material.

An important variation of DFM compilation is to expand the size of contact and via holes such that they become easier to fabricate.

The present invention is directed to methods and system that utilize the free space for improving manufacturing yield in conjunction with reticle enhancement technology for correcting distortions, specifically, methods and system for improving the manufacturing yield of an integrated circuit by optimizing the size of contact and via holes according to their surrounding geometry.

FIG. 1 shows a design layout fragment comprising a contact hole with minimal size, 100, and its surrounding geometries. The layout fragment consists of four layers: diffusion, poly silicon, contact, and the first metal layer. Contact 100 makes a vertical connection between the first metal layer wire 108 on the upper end and polysilicon object 110 on the lower end. The square shaped portion of object 110 forms a poly contact enclosure. The spacing from the edge of the contact hole 100 to the border of the polysilicon enclosure is constrained by the minimal contact enclosure rule.

In FIG. 1 the contact feature group 100, 108, and 110 is surrounded by layout objects 102, 104, 106, and 116. These geometries are fixed in position and shape due to constraints both inside and outside of this fragment. In addition, objects 110 and 102, and objects 110 and 116 are constrained by polysilicon minimum spacing; 108 and 106 are constrained by the minimal metal spacing; therefore, nearly all objects are at minimal spacing except for the separation between the top edge of the poly contact enclosure, (a), and diffusion object, 104. This separation 114, between field poly and diffusion, is greater than the minimal separation required by the design rule, as shown in the case of separation 112. The difference between separation 114 and minimal separation 112 is the free space for contact edge (c) to expand.

Figure 2:
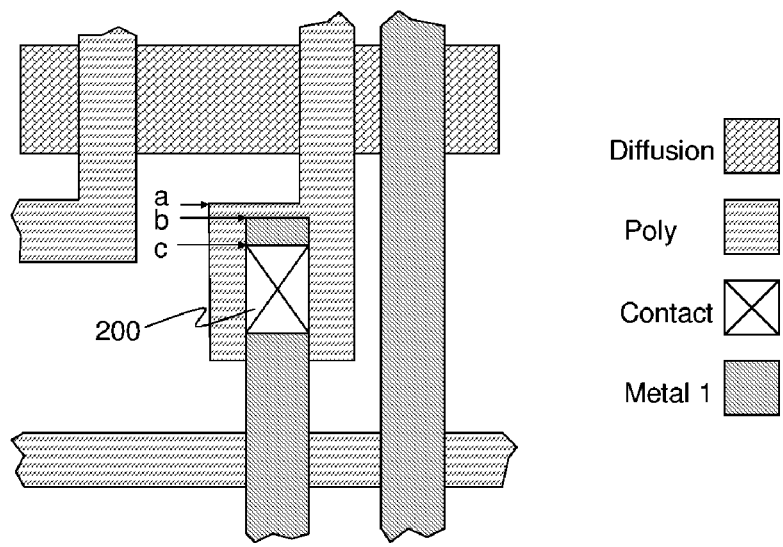
FIG. 2 is a schematic diagram showing a design layout fragment after adaptive via sizing in accordance with the present invention.

In FIG. 2, the size of contact 200 is expanded to take advantage of the free space in accordance to the present invention. In order to expand the contact hole while conforming to the design rules concerning contact enclosure for the first metal layer and polysilicon, the edges a, b, and c must be moved together, as shown in the figure.

The size of the contact hole after adaptive via sizing as demonstrated in FIG. 2 will be greater than minimal size. In a preferred embodiment, the sizing operation is performed for all four edges in the via drawing.

In a preferred embodiment, a predetermined search range is used to limit the search range to include a manageable number of polygon edges In a preferred embodiment, the magnitude of adaptive contact/via sizing is limited to a predetermined value, which may be less than the total available free space.

In a preferred embodiment, design rules that restrict contact to equal width and height with exact size must be modified to allow contact holes of greater than minimal size in the final layout. Additional design rule may be needed to constrain the distance between contact holes of a plurality of sizes. All software tools that use via related design rules must also be modified to accept greater than minimal via size.

In photolithography, when the size of a small hole is comparable or less than the wavelength, the physical size of the hole will scale non-linearly with the layout drawing. Effects such as diffraction and etching tend to produce a bigger hole on the wafer. In addition, an increasing its height always leads to certain amount of bloating in the width. The amount of bloating increases with the size of the increase in height, until the contact feature resembles a line. This unwanted feature made a variable via size on the same via layer impractical in prior art design layout In a preferred embodiment, we solve the problem of manufacturing distortion with reticle enhancement technology (RET). One technique, model based optical proximity correction (OPC), controls the distortion in manufacturing by pre-distort the image on the photomask in an opposite direction. An OPC program adjusts the mask pattern according to a processing model such that the bounding box of the final hole on the silicon wafer matches the design layout drawings.

Figure 3:
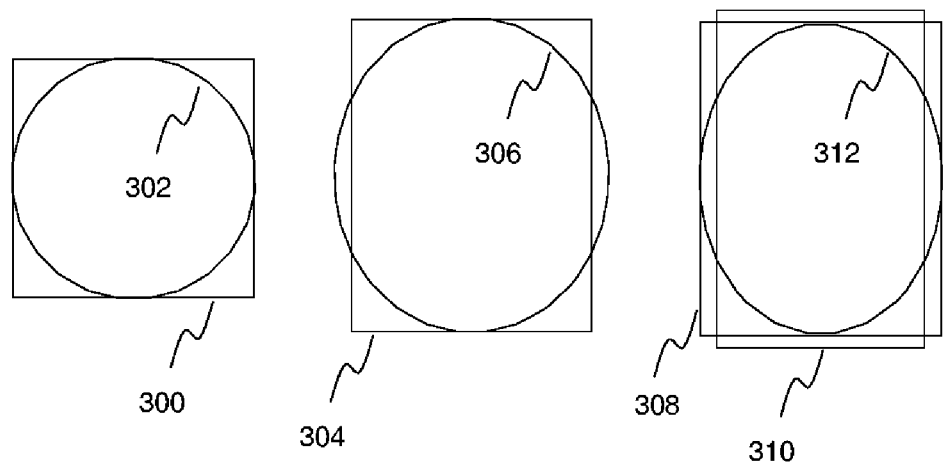
FIG. 3 is an illustration showing manufacturing distortion and the compensation method.

FIG. 3 shows the drawing of a minimal sized contact, 300, and its corresponding physical realization, i.e. the hole on the silicon wafer, 302. The manufacturing recipes are chosen such that the minimal contact produces a hole with bounding box equal to the drawing. When the hole size in the layout is increased, as drawn in 304, the image on the wafer 306 spills outside the designated hole area, causing yield problems.

In FIG. 3, we applied model based OPC to the original drawing of a via hole 308 and obtained mask pattern after OPC, 310. We use pattern 310 to build the actual pattern on the photomask, which is subsequently projected onto silicon. Because the width of the 310 is smaller than the width of 308 by an amount that compensates for the bloating, the resulting image 312, matches the bounding box of 308.

Other RET methods for compensating manufacturing distortions, such as using mask construction rules or using deconvolution of the manufacturing response functions can also be used to solve problems associated with adaptive via sizing.

Figure 4:
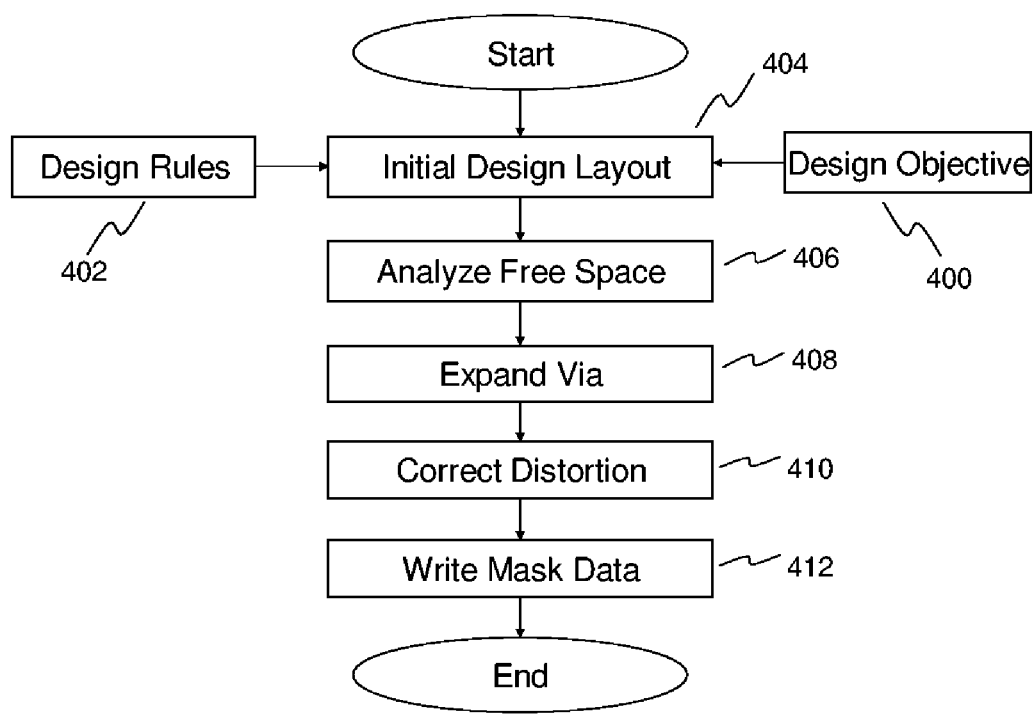
FIG. 4 is a flow/block diagram showing a method/system in accordance with the present invention.

FIG. 4 is a block/flow diagram for the present invention. Block 400 loads design objectives comprising shape and dimension of the layout boundary into the system.

Block 402 loads design rules into the system, which forms the constraint on layout polygons. In a preferred embodiment, the via size constraints comprise a minimal dimension rule which limits the minimal width and height to a predetermined value. This rule, however, does not require vias for signal routing to have the same size on a via or contact layer, nor require them to be in square shape, as in prior art design. In a preferred embodiment, design rules for limiting the minimal spacing between vias of various sizes are added according to the manufacturing capabilities.

At the start of the flow, the design objective is input from 400 to 404. Design rules are input from block 402 to block 404, where an initial or partial layout is constructed using minimal contact and via size according to the design objective and the design rules. Block 404 assigns initial contact and via edge locations and their surrounding geometry.

In a preferred embodiment, an initial layout can be any layout with know contact and via positions. An initial layout can be any layout with minimal via size. In this case, a layout can be loaded from external database, in standard GDSII, CIF, OASIS or any other format representing. Some design objectives such as the shape and dimension of the initial layout, are embedded in said layout.

In block 406, the layout is analyzed for free spaces where we identify the area available for vias to expand without violating design rules.

In block 408, vias are expanded into the adjacent free space under the constraint of design rule and design objective. Polygons edges and/or entire polygons are moved in order to accomplish via expansion. Jogs are inserted as an option to create additional free space by reducing the granularity of layout objects.

In a preferred embodiment, vias are classified into different classes. A weighting factor is assigned to each class. The amount of expansion and priority to the free space is assigned according to the type of classification. For example, a via in a double via pair may be assigned zero weight so that no expansion operation is performed on it.

In block 410, design layout after the adaptive via sizing steps of blocks 406 and 408 is transformed into mask data. In a preferred embodiment, model based OPC is performed on the design layout in order to match the feature on silicon wafer to the drawings in the design layout. The model used for OPC includes all error sources in the pattern transfer from layout drawing to the final etched hole in the dielectric, therefore, the correction is more comprehensive than the name OPC would normally suggest. Because this invention always produces vias larger than the minimal size, a solution to OPC problem can always be found.

Block 412 writes the mask layout data to a storage medium.

In a preferred embodiment, operations in blocks 406 and 408 can be performed by existing software tools. A via doubling tool already performs the tasks of searching and creating free spaces. In this case, we can add an option to generate vias of greater than minimal size in order to implement the present invention. This will extend yield enhancement to situations where the free spaces is too small to accommodate two minimal vias plus their required separation.

In a preferred embodiment, an engineering change order (ECO) software tool is used for operations in blocks 406 and 408, such as SiFix and other SiClone family of software program from Sagantec, or Virtuoso Layout Migrate from Cadence Design Systems. Via expansion is formulated as an ECO that requires all via sizes on a via layer to be increased to a predetermined size that is larger than the minimum. If the layout is densely packed and layout size is not allowed to change, such operation would yield a partial solution. This is still acceptable as long as we also limit the smallest via size in the solution to the design rule minimum. Locations where the new and larger via width cannot be reached are typically flagged by an ECO tool. These locations can be further improved with a manually layout editing step.

Figure 5:
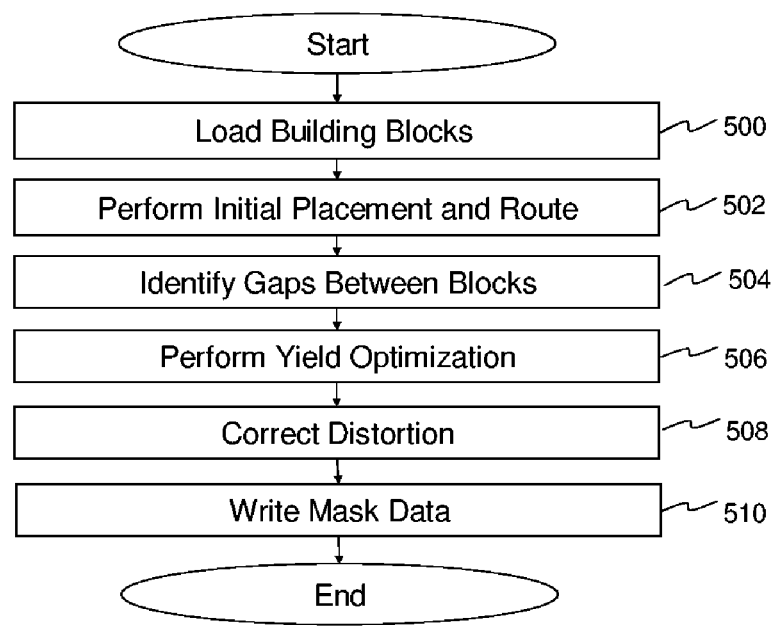
FIG. 5 is a flow/block diagram showing a method/system for yield enhancement.

FIG. 5 is a flow/block diagram for implementing adaptive via sizing in a design environment. Modern layout design is performed in stages. In the first stage, the drawing of circuit building blocks is performed. Each block performs a predetermined function. It is referred to as a functional block or intellectual property (IP) block. The functional blocks comprise standard cell libraries, memory, input/output circuitry, etc. These IP blocks are licensed in commercial market as products. At a later stage, these functional blocks are put together with placement and route software to form an entire system on chip (SOC).

In FIG. 5, block 500 loads pre-designed functional IP blocks into the system. In a preferred embodiment, we apply the flow described in FIG. 4 to the IP blocks such that the yield of these IP products is superior to their counter part with uniform contact size.

Block 502 performs the placement and route procedure. In a preferred embodiment, the router analyses the areas available for making vias and inserts vias of appropriate size in accordance with present invention. This procedure is essentially the same as the via doubling procedure already existing in routing products in terms of the internal software algorithm. In a preferred embodiment, an option for users to select one or more vias of greater than minimal size is added along with the capability to create such structure by the computer.

The solution for placement and route can leave gaps between placed blocks. Block 504 identifies the gaps between building blocks created by placement and route step and passes the information to block 506.

In block 506, via expansion is performed on the building blocks adjacent to the gaps. In this case, the entire layout area can expand into the gap, which is a special form of free space, resulting in more yield improvement than similar operation under fixed area constraints.

In a preferred embodiment, multiple versions of building blocks of equivalent electrical property but different layout size, via size, and yield characteristics are made available in a library. Each version in the library is precharacterized for their electrical properties so that they can be incorporated into a bigger circuit without further evaluation. Block 506 provides the means for picking the appropriate version based on the free space information.

Block 508 performs the task of correcting for manufacturing distortion. This step is similar to that in block 410 in FIG. 4.

Block 510 writes the mask layout data to a storage medium.

Figure 6:
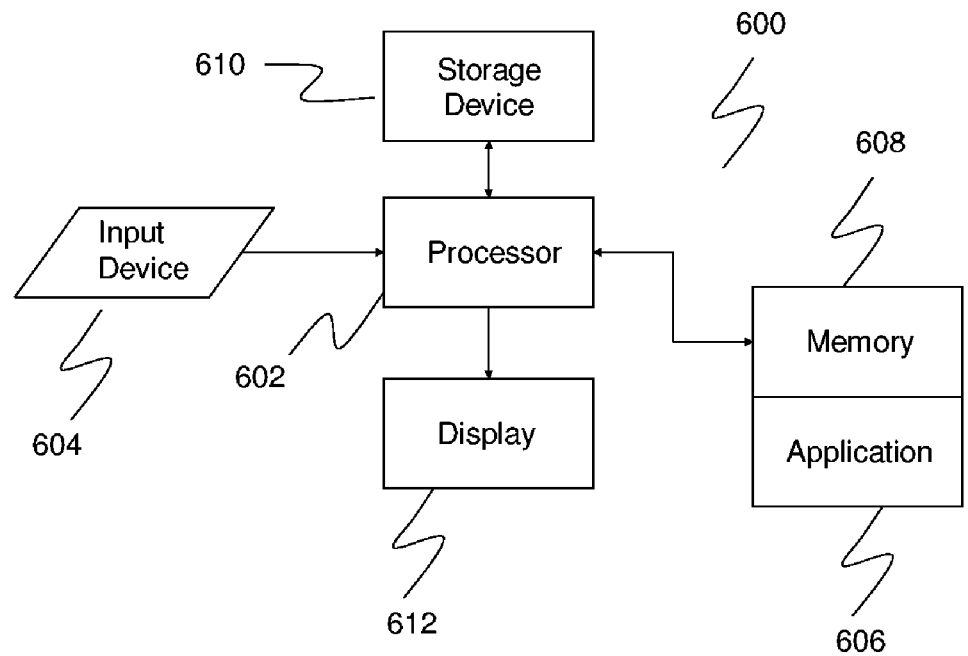
FIG. 6 is a block diagram showing a system for implementing the present invention.

Referring to FIG. 6, a block/flow diagram is shown for a system 600 of the present invention. System 600 includes a processor 602 that accesses memory device 608 and storage device 610. Memory device 608 stores an application software package 606 for implementing the present invention. Storage device 610 stores layout, operation recipes, and design rules. A user interfaces with the processor 602 through an input device, 604, which may include a keyboard, a mouse, a touch screen monitor, a voice recognition system or other known input devices. A display 612 is also included to display results, prompts, user inputs, graphics, etc.

While the present invention has been described in detail concerning the preferred embodiments, it should be appreciated that various modifications and variations may be made in the present invention without departing from the scope or spirit of the invention. In this regard, it is important to note that practicing the invention is not limited to the applications described hereinabove. Many other applications and/or alterations may be utilized if such other applications and/or alterations do not depart from the intended purpose of the present invention.

It should further be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as such modifications, embodiments and variations come within the scope of the appended claims and their equivalents.

REFERENCES (1) N. Harrison, "A simple via duplication tool for yield enhancement", IEEE Int. Symp. Defect Fault Tolerance VLSI Systems, pp. 39-47, 2001. pp. 556-573, April 2001.
(2) G. A. Allan, A. J. Walton, R. J. Holwill, "An Yield Improvement Technique for IC Layout Using Local Design Rules", IEEE Trans. CAD. Vol. 11 pp 1355-1362 1992.
(3) Martin Keck, Christof Bodendorf, Jorg Thiele, Alberto L. Gomez, Ying-Chung Tseng, and Teng-Yen Huang, "Simulation based OPC for contact pattern using 193 nm lithography" Proc. SPIE Int. Soc. Opt. Eng. 5853, 776 (2005)

What is claimed is:

1. A method for fabricating integrated devices, comprising:
    receiving one or more initial design layouts associated with an integrated device;
    receiving design objectives of said initial design layouts comprising size requirements;
    receiving layout design rules;
    identifying free spaces in accordance with said initial design layouts, design objectives and design rules;
    computing the sizes of a plurality of vias in accordance with said free spaces;
    implementing electrical connections using said vias in order to generate new design layouts comprising said vias of said computed sizes; applying proximity correction to generate the photomask patterns of said vias; and
    fabricating said integrated device using said photomask patterns.

2. Method of claim 1, wherein said design rules comprise a constraint on minimal via size.

3. Method of claim 1, wherein said design rules further comprise one or more constraints selected from a group consisting of: maximal via size, minimal via to via spacing for vias of one or more sizes, and their combinations thereof.

4. Method of claim 1, wherein said initial design layouts comprise layouts having vias of a plurality of sizes on one or more via layers.

5. Method of claim 1, wherein said identifying free spaces comprising measuring the distance between layout objects and comparing said distance to design rule and design objective constraints.

6. Method of claim 1, wherein said implementing electrical connections comprises moving one or more layout objects away from an existing via hole and expanding the size of said via hole in accordance with available free space.

7. Method of claim 1, wherein said implementing electrical connection comprises forming a new conducting path by inserting one or more new via holes of larger than a predetermined minimal size in accordance with available free space.

8. An integrated circuit product prepared by method of claim 1.

9. A non-transitory computer-readable medium having program instructions generating the layout of integrated devices, comprising:
    program instructions for receiving one or more initial design layouts;
    program instructions for receiving design objectives associated with said initial design layouts comprising size requirements;
    program instructions for receiving layout design rules;
    program instructions for identifying free spaces in accordance with said initial design layouts, design objectives and design rules;
    program instructions for computing the sizes of a plurality of vias in accordance with said free spaces; and
    program instructions for implementing one or more new electrical connections using one or more said vias; and
    program instructions for generating one or more new design layouts comprising one or more via layers having said vias of said computed sizes.

10. Computer-readable medium of claim 9 wherein said instructions for receiving design rules comprises instructions for receiving a constraint on a minimal via size.

11. Computer-readable medium of claim 9 wherein said instructions for receiving design rules further comprises instructions for receiving one or more constraints consisting of: maximal via size, minimal via to via spacing for vias of one or more sizes, and their combinations thereof.

12. Computer-readable medium of claim 9 wherein said instructions for receiving initial design layouts comprises instructions for receiving layouts having contacts of a plurality of sizes on a contact layer.

13. Computer-readable medium of claim 9 wherein said instructions for identifying free space comprises instructions for measuring the distance between layout objects and instructions for comparing said distance to design rule and design objective constraints.

14. Computer-readable medium of claim 9 further comprising instructions for applying proximity correction on the photomask patterns of said via layers.

15. Computer-readable medium of claim 9, wherein said vias carry modulating electric signal.

16. A method implemented on a computer for generating layout of integrated devices, comprising:
   receiving one or more initial design layouts;
   receiving design objectives associated with said initial design layouts comprising size requirements;
   receiving layout design rules;
   identifying free spaces in accordance with said initial design layouts, design objectives and design rules;
   computing the sizes of a plurality of vias in accordance with said free spaces;
   implementing new electrical connections using said vias; and
   generating, using a microprocessor, one or more new design layouts comprising via layers having said vias of said computed sizes.

17. Method of claim 16, wherein said design rules comprise permissions for variable via sizes between a predetermined minimal value and a predetermined maximal value on the same layer of a design layout.

18. Method of claim 16 wherein said initial design layouts comprise layouts having vias of a plurality of sizes on one or more layers.

19. Method of claim 16, further comprising applying proximity correction on said vias in order to generate the photomask layout of said vias.

20. An integrated circuit product prepared by method of claim 16.

\* \* \* \* \*